UNITED STATES PATENT OFFICE.

ALBERT E. GREENE, OF CHICAGO, ILLINOIS, ASSIGNOR TO AMERICAN ELECTRIC SMELTING AND ENGINEERING COMPANY, OF ST. LOUIS, MISSOURI, A CORPORATION OF MISSOURI.

PROCESS OF REMOVING SULFUR AND PHOSPHORUS FROM IRON AND SIMILAR METALS.

1,065,605.  Specification of Letters Patent.  Patented June 24, 1913.

No Drawing.  Application filed November 6, 1911. Serial No. 658,810.

*To all whom it may concern:*

Be it known that I, ALBERT E. GREENE, citizen of the United States, residing at Chicago, in the county of Cook and State of Illinois, have invented a certain new and useful Improvement in Processes of Removing Sulfur and Phosphorus from Iron and Similar Metals, of which the following is a full, clear, concise, and exact description.

This invention relates to the use of lime or other agents containing calcium for the removal of such impurities as sulfur or phosphorus from metals.

I have found that calcium compounds, such as lime and fluorspar, may be made to take up impurities such as phosphorus or sulfur at relatively low temperatures and also without the presence of such oxidizing conditions as would cause material loss of the metals being refined. In one of my co-pending applications, Serial No. 470,366, filed January 2nd, 1909, I have described a method of causing lime to react with phosphorus by the reduction of the lime by means of a gaseous reducing agent. In another application, Serial No. 444,740, filed July 22nd, 1908, I have described how lime may be made to take up phosphorus or sulfur by forming phosphates with the calcium of the lime.

My present invention is based on the fact that the rapidity of removal of phosphorus as an impurity depends to a considerable extent on the degree of contact obtained between the lime and the metal or material being refined. I have found that at a temperature of 1200° to 1400° C. lime rapidly takes up phosphorus under conditions which are reducing for iron oxid. One way in which I take advantage of this fact, in carrying out my present process, is to heat the lime preferably in a large shallow furnace to a temperature of at least 1200° C. before allowing the iron to react with it. In this way a large surface of metal is exposed to the action of the lime and the removal of phosphorus is facilitated.

Another way in which I carry out my process is to vaporize the calcium oxid preferably by exposing it to an electric arc and then conducting the vapor of lime into intimate contact with the metal. It may be sucked through the bath of metal thereby aiding in the volatilization of the lime, or it may be passed in contact with the metal in any other way. I preferably modify this treatment further by carrying out the volatilization of the lime under the influence of a reducing agent, preferably a reducing gas. Under such treatment there is also a partial reduction of the lime with resultant formation of vapors of metallic calcium mixed with the lime vapors. Under such conditions the phosphorus readily combines with calcium.

The chief advantage of my treatment lies in the rapidity of the elimination which results. The vapors of lime and of calcium come into intimate and immediate contact with the metal, and the rapidity of elimination of the phosphorus and sulfur is thereby increased.

What I claim is:

1. The process of eliminating phosphorus and sulfur from metals, which consists in subjecting lime to electric heat and thereby producing vapor of lime, and introducing said vapor into the body of the metal under treatment.

2. The process of eliminating phosphorus and sulfur from metals, which consists in subjecting lime to electric heat in the presence of a reducing agent, and introducing the resultant vapors and gases into the body of the metal under treatment.

3. The process of eliminating phosphorus and sulfur from metals, which consists in subjecting lime to electric heat in the presence of a gaseous reducing agent, and introducing the resultant vapors and gases into the body of the metal under treatment.

4. The process of eliminating phosphorus and sulfur from metals, which consists in heating lime in an electric furnace, withdrawing the resultant vapors by suction and thereby facilitating the vaporization of the lime, and introducing said vapors into the body of the metal under treatment.

In witness whereof, I hereunto subscribe my name this fourth day of November, A. D., 1911.

ALBERT E. GREENE.

Witnesses:
GEO. C. DAVISON,
McCLELLAND YOUNG.